United States Patent
Li et al.

(10) Patent No.: US 10,916,756 B2
(45) Date of Patent: Feb. 9, 2021

(54) SECONDARY BATTERY

(71) Applicant: CONTEMPORARY AMPEREX TECHNOLOGY CO., LIMITED, Ningde (CN)

(72) Inventors: Xiang Li, Ningde (CN); Jiajun Wang, Ningde (CN); Rulai Cai, Ningde (CN); Peng Wang, Ningde (CN); Wei Yang, Ningde (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 469 days.

(21) Appl. No.: 15/816,981

(22) Filed: Nov. 17, 2017

(65) Prior Publication Data

US 2018/0159107 A1 Jun. 7, 2018

(30) Foreign Application Priority Data

Dec. 2, 2016 (CN) .................. 2016 2 1318451 U

(51) Int. Cl.
*H01M 2/20* (2006.01)
*H01M 2/06* (2006.01)
(Continued)

(52) U.S. Cl.
CPC ............ *H01M 2/202* (2013.01); *H01M 2/04* (2013.01); *H01M 2/06* (2013.01); *H01M 2/22* (2013.01);
(Continued)

(58) Field of Classification Search
CPC ............................... H01M 2/22; H01M 2/202
See application file for complete search history.

(56) References Cited

U.S. PATENT DOCUMENTS

2016/0049635 A1* 2/2016 Park ...................... H01M 2/263
429/161

FOREIGN PATENT DOCUMENTS

CN 102035186 A 4/2011
CN 102208594 B 4/2015
(Continued)

OTHER PUBLICATIONS

Contemporary Amperex Technology Co., Limited, Extended European Search Report, EP17204308.5, dated May 3, 2018, 10 pgs.

*Primary Examiner* — Stephan J Essex
(74) *Attorney, Agent, or Firm* — Morgan, Lewis & Bockius LLP

(57) ABSTRACT

The present disclosure provides a secondary battery which comprises: a cap plate provided with a first electrode terminal and a second electrode terminal; an electrode assembly comprising a main body, a first electrode tab and a second electrode tab; a first connecting piece connected between the first electrode tab and the first electrode terminal. The second electrode tab is electrically connected with the second electrode terminal. The first connecting piece includes a first electrode terminal connecting portion, a first electrode tab connecting portion and a first fusing portion. The secondary battery further comprises an insulating piece adhered on a surface of the first connecting piece which is connected with the first electrode tab, and the insulating piece at least covers an edge of the first electrode terminal connecting portion close to the first electrode tab, so as to isolate the first electrode tab from the first electrode terminal connecting portion.

9 Claims, 5 Drawing Sheets

(51) Int. Cl.
*H01M 2/30* (2006.01)
*H01M 2/04* (2006.01)
*H01M 2/22* (2006.01)
*H01M 2/34* (2006.01)

(52) U.S. Cl.
CPC ............... *H01M 2/30* (2013.01); *H01M 2/34* (2013.01); *H01M 2200/103* (2013.01)

(56) References Cited

FOREIGN PATENT DOCUMENTS

| | | | | |
|---|---|---|---|---|
| CN | 204927440 U | 12/2015 | | |
| CN | 205376627 U | 7/2016 | | |
| CN | 205429058 U | 8/2016 | | |
| EP | 2416406 A1 * | 2/2012 | .......... | H01M 2/0275 |
| EP | 2581965 A1 | 4/2013 | | |
| EP | 2793291 A2 | 10/2014 | | |
| EP | 2858144 A1 | 4/2015 | | |

* cited by examiner

SECONDARY BATTERY

CROSS-REFERENCE TO RELATED APPLICATIONS

The present application claims priority to Chinese patent application No. 201621318451.0, filed on Dec. 2, 2016, which is incorporated herein by reference in its entirety.

FIELD OF THE PRESENT DISCLOSURE

The present disclosure relates to the field of battery, and particularly relates to a secondary battery.

BACKGROUND OF THE PRESENT DISCLOSURE

A secondary battery generally comprises an electrode assembly and a cap plate, an electrode tab of the electrode assembly and an electrode terminal of the cap plate are electrically connected via a connecting piece. The connecting piece includes an electrode tab connecting portion and an electrode terminal connecting portion, the electrode tab connecting portion is fixed to and electrically connected with the electrode tab of the electrode assembly, the electrode terminal connecting portion is fixed to and electrically connected with the electrode terminal of the cap plate. In order to improve safety performance of the secondary battery, a fusing portion is provided between the electrode tab connecting portion and the electrode terminal connecting portion, when the secondary battery is overcharged or short-circuited, the fusing portion will be fused to cut off the circuit, and prevent an explosion of the secondary battery. However, in order to ensure that the electrode tab has a sufficient overcurrent sectional area when the electrode tab is connected with the electrode tab connecting portion, the electrode tab needs to have a sufficient large width, so the electrode tab may contact the edge of the electrode terminal connecting portion because of the welding misalignment or the large width of the electrode tab, thereby resulting in the directly electrical connection between the electrode tab and the electrode terminal connecting portion; when the secondary battery is overcharged or short-circuited, the fusing portion cannot cut off the circuit even if the fusing portion is fused, which leads to a failure of the fusing portion.

SUMMARY OF THE PRESENT DISCLOSURE

In view of the problem existing in the background, an object of the present disclosure is to provide a secondary battery, which can promote the safety performance thereof.

In order to achieve the above object, the present disclosure provides a secondary battery which comprises: a cap plate provided with a first electrode terminal and a second electrode terminal; an electrode assembly comprising a main body, a first electrode tab provided to the main body and a second electrode tab provided to the main body; and a first connecting piece connected between the first electrode tab and the first electrode terminal. The second electrode tab is electrically connected with the second electrode terminal. The first connecting piece includes a first electrode terminal connecting portion, a first electrode tab connecting portion and a first fusing portion, the first electrode terminal connecting portion is fixed to the first electrode terminal, the first electrode tab connecting portion is fixed to the first electrode tab, and the first fusing portion is connected between the first electrode terminal connecting portion and the first electrode tab connecting portion. The secondary battery further comprises an insulating piece adhered on a surface of the first connecting piece which is connected with the first electrode tab, and the insulating piece at least covers an edge of the first electrode terminal connecting portion close to the first electrode tab, so as to isolate the first electrode tab from the first electrode terminal connecting portion.

The present disclosure has the following beneficial effects: in the secondary battery according to the present disclosure, the insulating piece can avoid the first electrode tab fixed to the first electrode tab connecting portion directly contacting the edge of the first electrode terminal connecting portion close to the first electrode tab if the first electrode tab is too long, prevent a failure of the first fusing portion caused by an electrical connection between the first electrode tab and the first electrode terminal connecting portion, and improve safety performance of the secondary battery.

Figure 1:
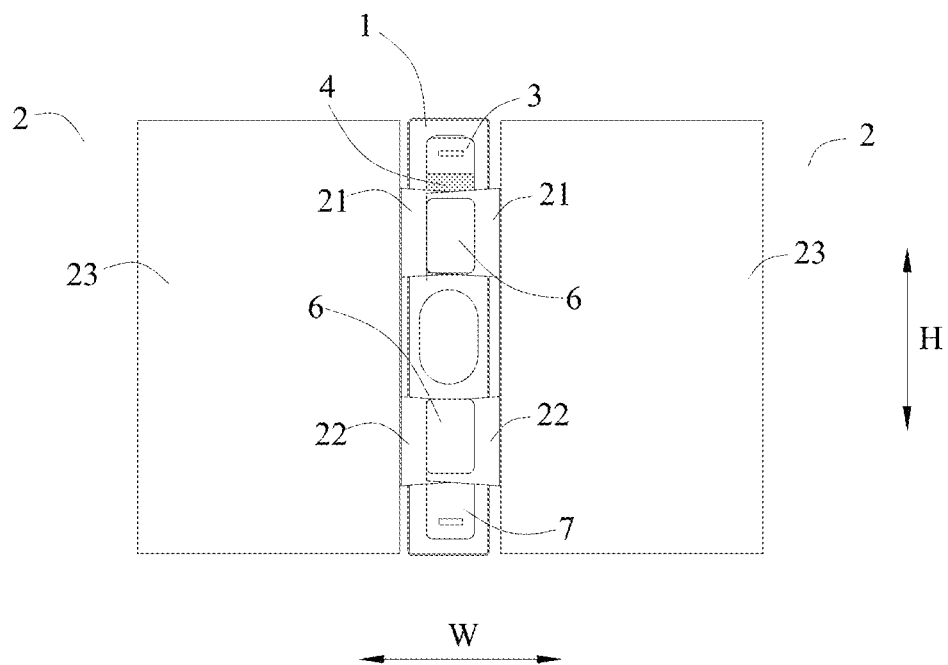
FIG. 1 is a schematic view of an embodiment of a secondary battery according to the present disclosure.

Reference numerals in figures are represented as follows:
1 cap plate
  11 first electrode terminal
  12 second electrode terminal
2 electrode assembly
  21 first electrode tab
    211 connecting section
    212 bending section
  22 second electrode tab
  23 main body
3 first connecting piece
  31 first electrode terminal connecting portion
  32 first electrode tab connecting portion
    321 first electrode tab connecting sub-portion
    322 first electrode tab jointing sub-portion
  33 first fusing portion
    331 fusing sub-portion
4 insulating piece
5 insulating bar
6 welding protecting piece
7 second connecting piece
E edge
O opening
G notch
S insulating adhesive
L length direction W width direction
H height direction

DETAILED DESCRIPTION

Hereinafter a secondary battery according to the present disclosure will be described in detail in combination with the figures.

Referring to FIGS. 1-10, a secondary battery according to the present disclosure comprises a cap plate 1, an electrode assembly 2 and a first connecting piece 3. The cap plate 1 is provided with a first electrode terminal 11 and a second electrode terminal 12 which are opposite in electrical polarity. The electrode assembly 2 comprises a main body 23, a first electrode tab 21 and a second electrode tab 22, the first electrode tab 21 and the second electrode tab 22 are provided to the main body 23 and opposite in electrical polarity. The first connecting piece 3 is connected in series between the first electrode tab 21 and the first electrode terminal 11. The second electrode tab 22 is electrically connected with the second electrode terminal 12. The first connecting piece 3 includes a first electrode terminal connecting portion 31, a first electrode tab connecting portion 32 and a first fusing portion 33, the first electrode terminal connecting portion 31 is fixed to and electrically connected with the first electrode terminal 11, the first electrode tab connecting portion 32 is fixed to and electrically connected with the first electrode tab 21, and the first fusing portion 33 is connected in series between the first electrode terminal connecting portion 31 and the first electrode tab connecting portion 32. The secondary battery further comprises an insulating piece 4 adhered on a surface of the first connecting piece 3 which is connected with the first electrode tab 21, and the insulating piece 4 at least covers an edge E of the first electrode terminal connecting portion 31 close to the first electrode tab 21, so as to isolate the first electrode tab 21 from the first electrode terminal connecting portion 31.

In the secondary battery according to the present disclosure, the insulating piece 4 can avoid the first electrode tab 21 fixed to the first electrode tab connecting portion 32 directly contacting the edge E of the first electrode terminal connecting portion 31 close to the first electrode tab 21 if the first electrode tab 21 is too long, prevent a failure of the first fusing portion 33 caused by an electrical connection between the first electrode tab 21 and the first electrode terminal connecting portion 31, and improve safety performance of the secondary battery.

In the secondary battery according to the present disclosure, an area of the edge E depends on a length of the first electrode tab 21 which may extend to the first electrode terminal connecting portion 31. The insulating piece 4 is adhered on the first connecting piece 3 before welding the first connecting piece 3 to the first electrode terminal 11, so in order to realize the welding, the insulating piece 4 cannot cover a part of the first electrode terminal connecting portion 31 which is welded with the first electrode terminal 11.

Figure 5:
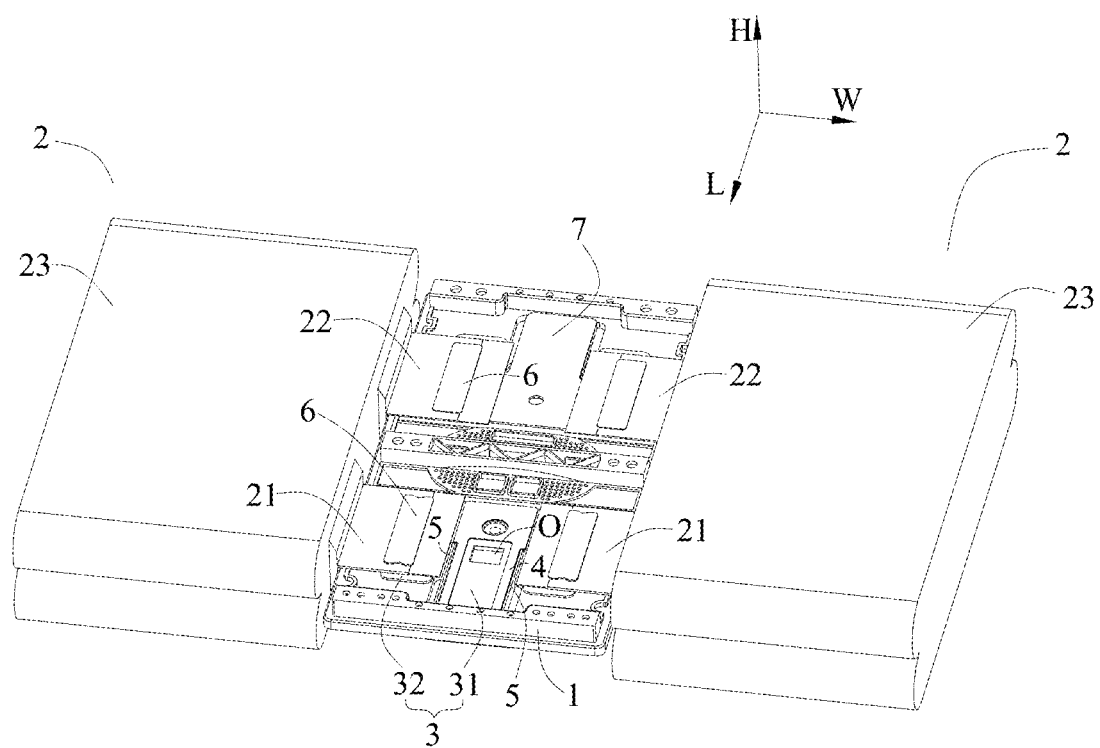
FIG. 5 is a schematic view of another embodiment of the secondary battery according to the present disclosure.
Figure 6:
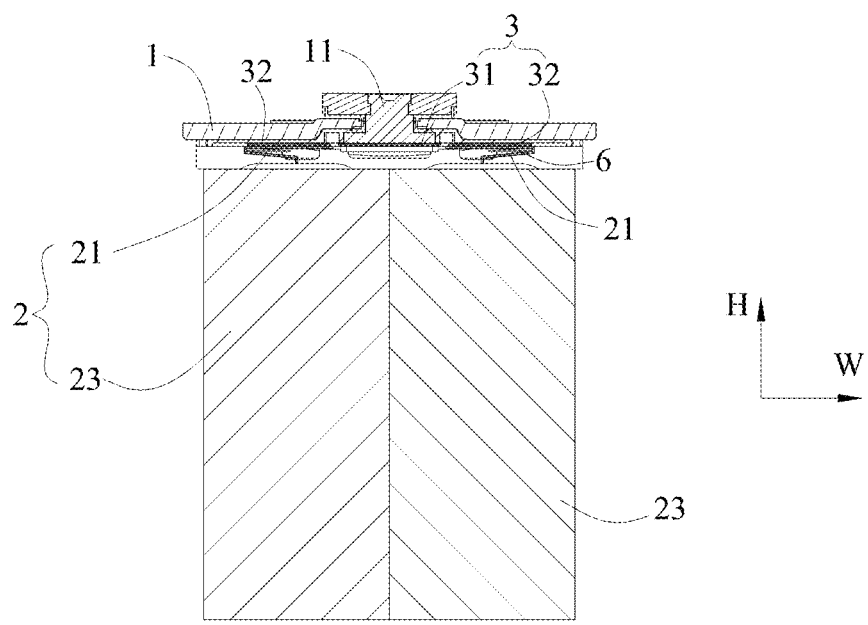
FIG. 6 is a cross sectional view of the another embodiment of the secondary battery according to the present disclosure.
Figure 10:
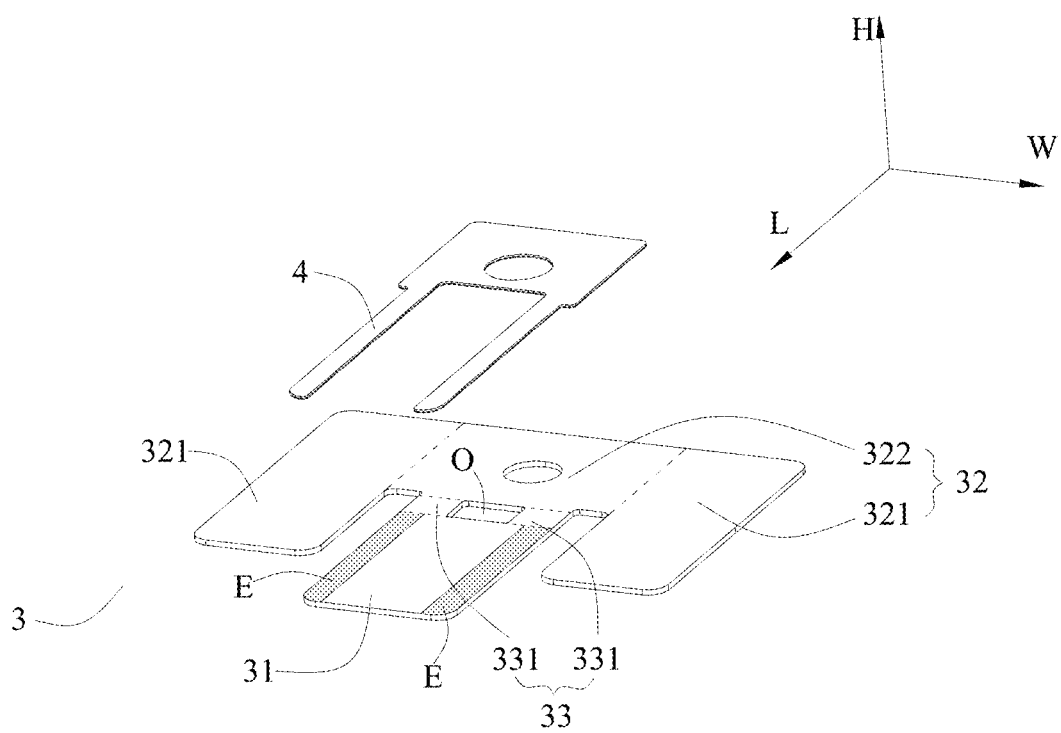
FIG. 10 is another schematic view of the first connecting piece of the secondary battery according to the present disclosure.

In the secondary battery according to the present disclosure, referring to FIG. 5 and FIG. 10, the first fusing portion 33 is formed by providing an opening O in the first connecting piece 3, and the first fusing portion 33 includes fusing sub-portions 331 provided at two sides of the opening O respectively along a width direction W.

Figure 9:
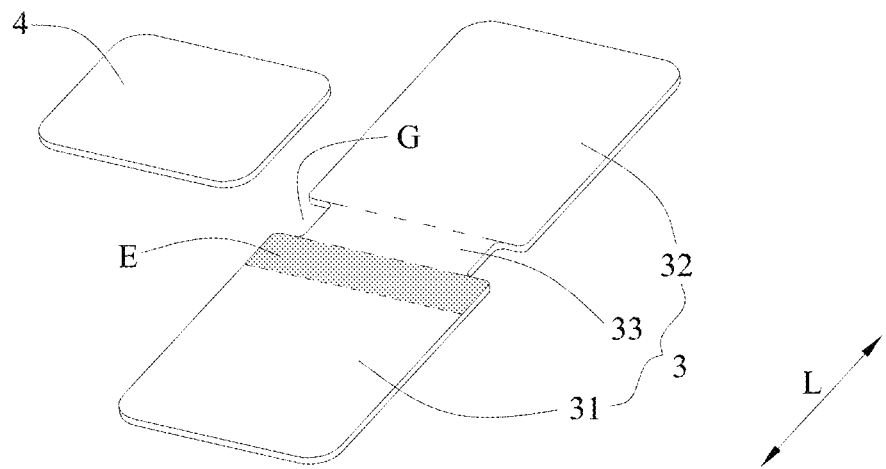
FIG. 9 is a schematic view of a first connecting piece of the secondary battery according to the present disclosure.

In the secondary battery according to the present disclosure, referring to FIG. 9, the first fusing portion 33 is formed by providing notches G in the first connecting piece 3, and the notches G are provided at two sides of the first fusing portion 33 respectively along the width direction W.

In the secondary battery according to the present disclosure, an overcurrent sectional area of the first fusing portion 33 is smaller than an overcurrent sectional area of the first electrode terminal connecting portion 31 and an overcurrent sectional area of the first electrode tab connecting portion 32 (due to provision of the opening O or the notches G), therefore, when the high current flows through the first connecting piece 3, the first fusing portion 33 will be fused in time so as to quickly cut off the electrical connection between the first electrode tab 21 and the first electrode terminal 11, and prevent thermal runaway of the secondary battery.

Figure 2:
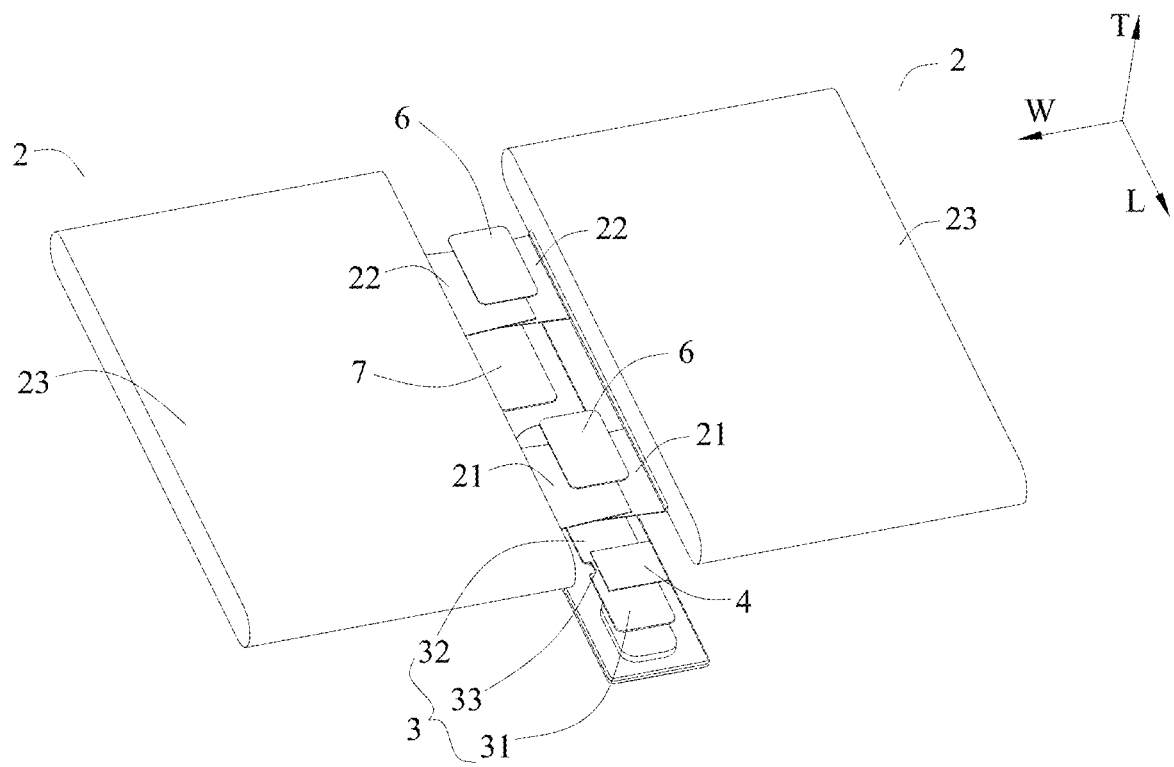
FIG. 2 is an exploded view of FIG. 1.
Figure 3:
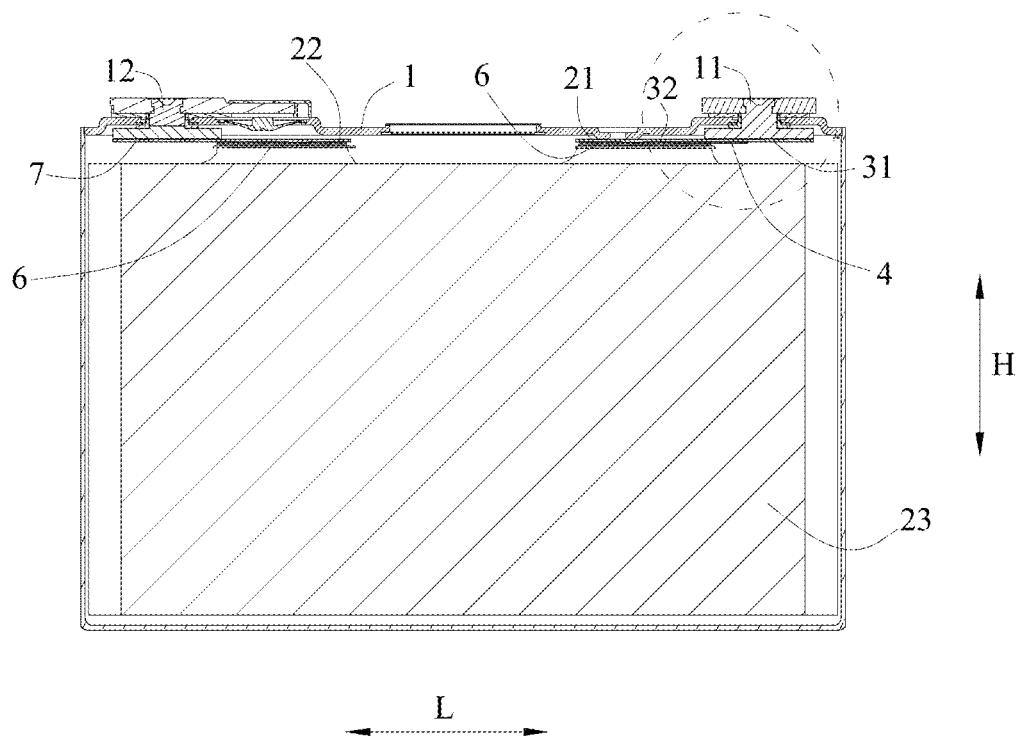
FIG. 3 is a cross sectional view of an embodiment of the secondary battery according to the present disclosure.

In the secondary battery according to the present disclosure, referring to FIG. 2 and FIG. 9, the first electrode terminal connecting portion 31, the first electrode tab connecting portion 32 and the first fusing portion 33 extend in a length direction L. Correspondingly, the insulating piece 4 at least covers the edge E of the first electrode terminal connecting portion 31 connected with the first fusing portion 33 in the length direction L. Referring to FIG. 2, in order to ensure an overcurrent sectional area of the first electrode tab 21, the first electrode tab 21 needs to have a sufficient large length in the length direction L; in the process of welding the first electrode tab 21 and the first electrode tab connecting portion 32, the first electrode tab 21 may contact the edge E of the first electrode terminal connecting portion 31 because of the welding misalignment or the large length of the first electrode tab 21, so the insulating piece 4 can isolate the edge E from the first electrode tab 21, prevent the failure of the first fusing portion 33 caused by the electrical connection between the first electrode tab 21 and the first electrode terminal connecting portion 31, and improve safety performance of the secondary battery.

In the secondary battery according to the present disclosure, referring to FIG. 5 and FIG. 10, the electrode assembly 2 is provided as multiple in number. The first electrode tab connecting portion 32 includes two first electrode tab connecting sub-portions 321 and a first electrode tab jointing sub-portion 322. The two first electrode tab connecting sub-portions 321 extend along the length direction L, and each first electrode tab connecting sub-portion 321 is fixed to and electrically connected with the first electrode tab 21 of the corresponding electrode assembly 2. The first electrode tab jointing sub-portion 322 extends along the width direction W, and two ends of the first electrode tab jointing sub-portion 322 are connected with the two first electrode tab connecting sub-portions 321 respectively. The first electrode terminal connecting portion 31 is positioned between the two first electrode tab connecting sub-portions 321 and extends along the length direction L; the first fusing portion 33 extends along the length direction L and is connected between the first electrode tab jointing sub-portion 322 and the first electrode terminal connecting portion 31.

In the secondary battery according to the present disclosure, an extending direction and an arranging way of the two first electrode tab connecting sub-portions 321 (the two first electrode tab connecting sub-portions 321 are the same as the first electrode terminal connecting portion 31 in the extending direction, and are provided at two sides of the first electrode terminal connecting portion 31 respectively along the width direction W) can increase a contact area between the first electrode tab 21 of the electrode assembly 2 and the corresponding first electrode tab connecting sub-portion 321, thereby increasing the overcurrent area.

In the secondary battery according to the present disclosure, referring to FIG. 5 and FIG. 10, the insulating piece 4 at least covers the two edges E of the first electrode terminal connecting portion 31 which are respectively positioned at two sides of the first electrode terminal connecting portion 31 along the width direction W. Referring to FIG. 5, in order to ensure the overcurrent sectional area of the first electrode tab 21, the first electrode tab 21 needs to have a sufficient large width in the width direction W; in the process of welding the first electrode tab 21 and the corresponding first electrode tab connecting sub-portion 321, the first electrode tab 21 will contact the edge E of the first electrode terminal connecting portion 31 because of the welding misalignment or the large width of the first electrode tab 21, so the insulating piece 4 can isolate the corresponding edge E from the first electrode tab 21, prevent the failure of the first fusing portion 33 caused by the electrical connection between the first electrode tab 21 and the first electrode terminal connecting portion 31, and improve safety performance of the secondary battery.

Figure 4:
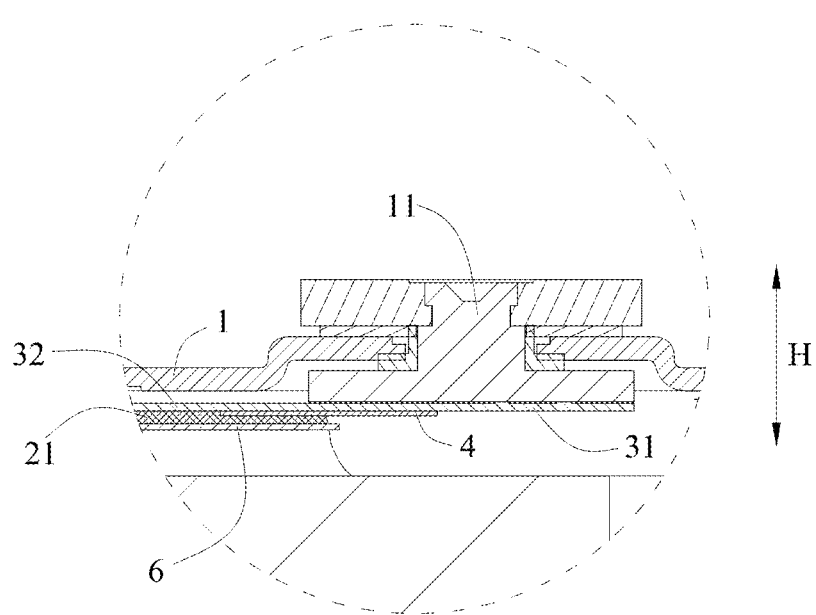
FIG. 4 is an enlarged view of a dotted circle of FIG. 3.

In the secondary battery according to the present disclosure, referring to FIG. 5, the secondary battery further comprises two insulating bars 5, each insulating bar 5 is provided in a gap between the first electrode terminal connecting portion 31 and the first electrode tab connecting sub-portion 321, and each insulating bar 5 is not lower than a surface of the first connecting piece 3 which is connected with the first electrode tab 21 along a height direction H (in other words, each insulating bar 5 is not lower than a surface of the first electrode terminal connecting portion 31 which faces the main body 23 of the electrode assembly 2 along the height direction H). The first electrode tab 21 may extend beyond the gap and extend to the edge E of the first electrode terminal connecting portion 31 if the first electrode tab 21 is too long, thereby leading to a directly contact between the first electrode tab 21 and the first electrode terminal connecting portion 31, and resulting in the failure of the first fusing portion 33. Because the two insulating bars 5 are respectively provided in the two gaps and each insulating bar 5 is not lower than the surface of the first connecting piece 3 which is connected with the first electrode tab 21 along the height direction H, the insulating bars 5 can function for isolation and prevent the first electrode tab 21 from electrically connecting with the first electrode terminal connecting portion 31 (if each insulating bar 5 is flush with the surface of the first connecting piece 3 which is connected with the first electrode tab 21 along the height direction H, each insulating bar 5 can avoid the first electrode tab 21 electrically connecting with a side wall of the first electrode terminal connecting portion 31 which is used to form the corresponding gap, and if each insulating bar 5 is higher than the surface of the first connecting piece 3 which is connected with the first electrode tab 21 along the height direction H, each insulating bar 5 can further avoid the first electrode tab 21 contacting the edge E of the first electrode terminal connecting portion 31). In addition, the "not lower than" and the "higher than" are with respect to the height direction H as shown in FIG. 5, in other words, each insulating bar 5 is flush with the first connecting piece 3 or is protruding from the first connecting piece 3 along a direction toward the electrode assembly 2 after the secondary battery is formed as a finished product as shown in FIG. 4.

In the secondary battery according to the present disclosure, referring to FIG. 1, FIG. 2 and FIG. 5, the insulating piece 4 further covers the first fusing portion 33. If the first electrode tab 21 contacts the residual part of the first fusing portion 33 which is connected with the first electrode terminal connecting portion 31 after the first fusing portion 33 is fused, it will lead to the failure of the first fusing portion 33 too, therefore, the insulating piece 4 covers the first fusing portion 33 to isolate the first fusing portion 33 from the first electrode tab 21, prevent the failure of the first fusing portion 33 and improve the safety performance of the secondary battery.

Figure 7:
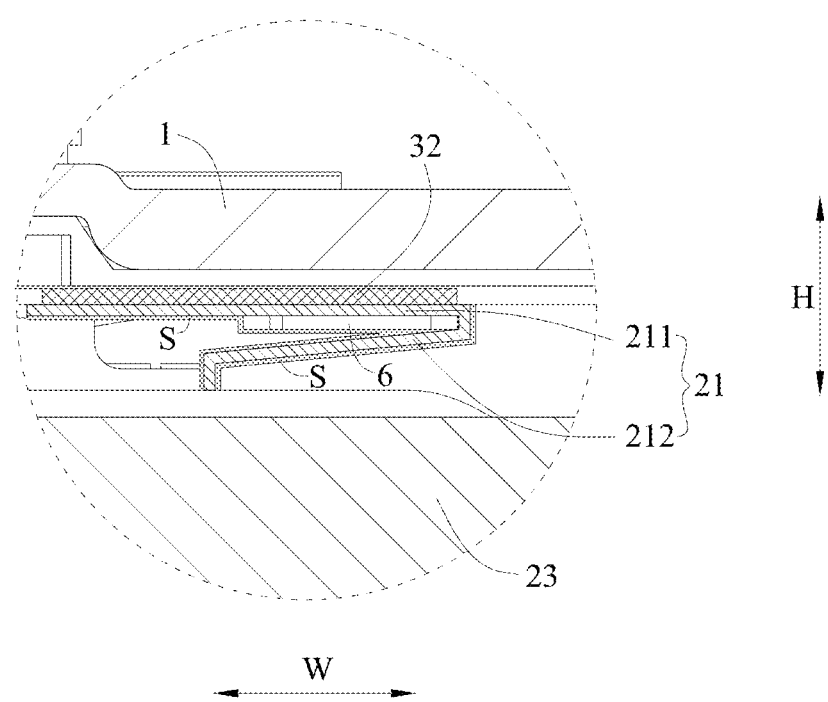
FIG. 7 is a schematic view of a first electrode tab of the secondary battery according to the present disclosure.
Figure 8:
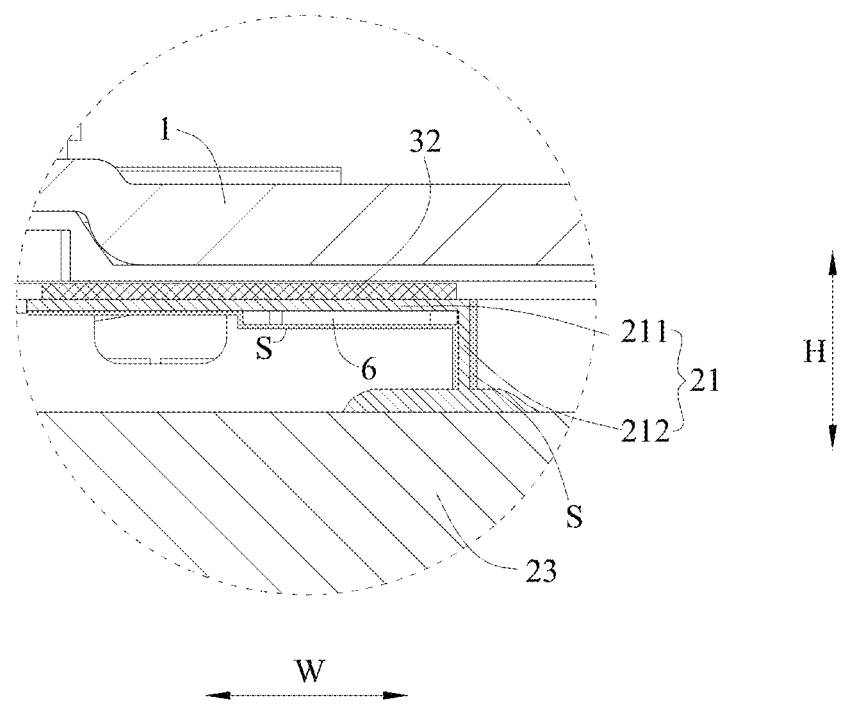
FIG. 8 is another schematic view of the first electrode tab of the secondary battery according to the present disclosure.

In the secondary battery according to the present disclosure, referring to FIG. 7 and FIG. 8, the first electrode tab 21 includes a connecting section 211 and a bending section 212. An outer side of the connecting section 211 is securely connected with the first electrode tab connecting portion 32; the bending section 212 bends and is connected between the main body 23 of the electrode assembly 2 and the connecting section 211, and an angle between the connecting section 211 and the bending section 212 is less than 120 degrees.

In the secondary battery according to the present disclosure, referring to FIG. 8, the angle between the connecting section 211 and the bending section 212 ranges from 85 degrees to 95 degrees. At this time, the bending section 212 extends nearly along the thickness direction T, so as to prevent short circuit caused by the bending section 212 when the bending section 212 is pressed down.

In the secondary battery according to the present disclosure, referring to FIG. 7, the angle between the connecting section 211 and the bending section 212 ranges from 0 degrees to 45 degrees. At this time, the bending section 212 nearly folds back onto the connecting section 211, thereby effectively reducing the space occupied by the first electrode tab 21, and promoting a utilization rate of the space inside the secondary battery.

In the secondary battery according to the present disclosure, referring to FIG. 7 and FIG. 8, the secondary battery further comprises an insulating adhesive S, the insulating adhesive S at least is adhered on an inside portion of the connecting section 211 which directly faces the main body 23 of the electrode assembly 2. When the cap plate 1 is assembled to a case (not shown) receiving the electrode assembly 2, the cap plate 1 will press down the first electrode tab 21 to easily result in that the connecting section 211 (especially the portion of the connecting section 211 which directly faces the main body 23 of the electrode assembly 2) of the first electrode tab 21 will directly contact the main body 23 (especially an electrode plate of the main body 23 which is opposite to the first electrode tab 21 in electrical polarity) of the electrode assembly 2, thereby resulting in short circuit; but it can avoid the short circuit of the electrode assembly 2 and improve the safety performance of the secondary battery by provision of the insulating adhesive S.

In the secondary battery according to the present disclosure, referring to FIG. 7 and FIG. 8, preferably, each of the inside portion of the connecting section 211 and an inside portion of the bending section 212 is covered by the insulating adhesive S.

In the secondary battery according to the present disclosure, referring to FIG. 7 and FIG. 8, the secondary battery further comprises an insulating adhesive S adhered on an outside portion of the bending section 212. When the cap plate 1 is assembled to the case (not shown) receiving the electrode assembly 2, the first electrode tab 21 will be pressed down and bent, and the outside portion of the bending section 212 will easily contact the case, thereby resulting in short circuit; but it can avoid the short circuit of the electrode assembly 2 and improve the safety performance of the secondary battery by provision of the insulating adhesive S which covers the outside portion of the bending section 212.

In the secondary battery according to the present disclosure, referring to FIG. 1, FIG. 2, FIG. 3 and FIG. 5, the secondary battery further comprises a second connecting piece 7 connected in series between the second electrode tab 22 and second electrode terminal 12.

In the secondary battery according to the present disclosure, the secondary battery further comprises a plurality of welding protecting pieces 6, and each welding protecting piece 6 is provided on a first electrode tab 21 or a second electrode tab 22. The welding protecting piece 6, the corresponding first electrode tab 21 and the first connecting piece 3 are securely connected together by ultrasonic welding; the welding protecting piece 6, the corresponding second electrode tab 22 and the second connecting piece 7 are securely connected together by ultrasonic welding. The welding protecting pieces 6 can improve connection strength between the first electrode tab 21 and the first connecting piece 3 and connection strength between the second electrode tab 22 and the second connecting piece 7. An insulating adhesive tape is adhered on weld zones formed during the ultrasonic welding. Metal scraps generated during the welding can be fixed to the insulating adhesive tape, so the insulating adhesive tape can prevent the metal scraps from entering into the inside of the electrode assembly 2, also function for insulation and avoid the short circuit of the electrode assembly 2.

What is claimed is:

1. A secondary battery, comprising:
a cap plate provided with a first electrode terminal and a second electrode terminal;
an electrode assembly comprising a main body, a first electrode tab provided to the main body and a second electrode tab provided to the main body; and
a first connecting piece serially connected between the first electrode tab and the first electrode terminal;
the second electrode tab being electrically connected to the second electrode terminal;
wherein
the first connecting piece includes a first electrode terminal connecting portion, a first electrode tab connecting portion and a first fusing portion, the first electrode terminal connecting portion is fixed to the first electrode terminal, the first electrode tab connecting portion is fixed to the first electrode tab, and the first fusing portion is connected between the first electrode terminal connecting portion and the first electrode tab connecting portion;
the first connecting piece has a flat plate shape with a first surface and a second surface which is opposite to the first surface, the first surface facing the cap plate, the second surface facing the electrode assembly;
the first electrode tab includes a connecting section and a bending section, the connecting section is connected to the first electrode tab connecting portion on the second surface of the first connecting piece, the first electrode terminal connecting portion is fixed to the first electrode terminal on the first surface of the first connecting piece, the bending section bends and is serially connected between the main body of the electrode assembly and the connecting section; and
the secondary battery further comprises an insulating piece adhered on the second surface of the first connecting piece, and an edge of the second surface of the first connecting piece corresponding to the first electrode terminal connecting portion and the first fusing portion are covered by the insulating piece to prevent the connecting section of the first electrode tab from directly contacting the edge.

2. The secondary battery according to claim 1, wherein the first fusing portion is formed by providing an opening in the first connecting piece, and the first fusing portion includes fusing sub-portions provided at two sides of the opening respectively along a width direction; or
the first fusing portion is formed by providing notches in the first connecting piece, and the notches are provided at two sides of the first fusing portion respectively along the width direction.

3. The secondary battery according to claim 1, wherein the electrode assembly is provided as multiple in number;
the first electrode tab connecting portion includes two first electrode tab connecting sub-portions and a first electrode tab jointing sub-portion;
the two first electrode tab connecting sub-portions extend along a length direction, and each first electrode tab connecting sub-portion is fixed to the first electrode tab of the corresponding electrode assembly;
the first electrode tab jointing sub-portion extends along a width direction, and two ends of the first electrode tab jointing sub-portion are connected to the two first electrode tab connecting sub-portions respectively;
the first electrode terminal connecting portion is positioned between the two first electrode tab connecting sub-portions and extends along the length direction;
the first fusing portion extends along the length direction and is connected between the first electrode tab jointing sub-portion and the first electrode terminal connecting portion.

4. The secondary battery according to claim 3, wherein the insulating piece at least covers the two edges of the first electrode terminal connecting portion which are respectively positioned at two sides of the first electrode terminal connecting portion along the width direction.

5. The secondary battery according to claim 3, wherein the secondary battery further comprises two insulating bars, each insulating bar is provided in a gap between the first electrode terminal connecting portion and the first electrode tab connecting sub-portion, and each insulating bar is not lower than a surface of the first connecting piece which is connected to the first electrode tab along a height direction.

6. The secondary battery according to claim 3, wherein the insulating piece further covers the first fusing portion.

7. The secondary battery according to claim 1, wherein an angle between the connecting section and the bending section is less than 120 degrees.

8. The secondary battery according to claim 7, wherein the angle between the connecting section and the bending section ranges from 85 degrees to 95 degrees; or
the angle between the connecting section and the bending section ranges from 0 degrees to 45 degrees.

9. The secondary battery according to claim 7, wherein the secondary battery further comprises an insulating adhesive, the insulating adhesive is adhered on an inside portion of the connecting section which directly faces the main body of the electrode assembly; and/or
the secondary battery further comprises an insulating adhesive adhered on an outside portion of the bending section.

* * * * *